United States Patent [19]

Sharma et al.

[11] Patent Number: 5,585,192
[45] Date of Patent: *Dec. 17, 1996

[54] WATERBORNE POLYOLEFIN ADHESION PROMOTER

[75] Inventors: Mahendra K. Sharma, Kingsport; Kevin A. Williams, Mount Carmel, both of Tenn.; Michael Bellas, Lancashire, England

[73] Assignee: Eastman Chemical Company, Kingsport, Tenn.

[ * ] Notice: The term of this patent shall not extend beyond the expiration date of Pat. No. 5,373,048.

[21] Appl. No.: 537,968

[22] Filed: Oct. 2, 1995

[51] Int. Cl.⁶ .................................... B32B 27/00
[52] U.S. Cl. .......................... 428/500; 428/512; 524/96; 524/236; 524/247; 524/401; 524/428; 524/429
[58] Field of Search ............................ 524/96, 247, 236, 524/401, 428, 429; 428/500, 512

[56] References Cited

U.S. PATENT DOCUMENTS

| | | | |
|---|---|---|---|
| 3,644,258 | 2/1972 | Moore et al. | 260/29.6 |
| 3,919,176 | 11/1975 | Meyer, Jr. et al. | 260/78.4 |
| 4,567,223 | 1/1986 | Ames | 524/489 |
| 4,613,679 | 9/1986 | Mainord | 560/190 |
| 5,373,048 | 12/1994 | Witzeman et al. | 524/458 |

*Primary Examiner*—Peter D. Mulcahy
*Attorney, Agent, or Firm*—Harry J. Gwinnell; John D. Thallemer

[57] ABSTRACT

This invention is directed to a waterborne polyolefin composition which is useful as an adhesion promotor and is prepared by emulsifying non-oxidized, non-maleated, non-chlorinated, crystalline polyolefins and non-chlorinated, maleated, amorphous polyolefins in the presence of a surfactant, an amine and water.

25 Claims, No Drawings

WATERBORNE POLYOLEFIN ADHESION PROMOTER

FIELD OF THE INVENTION

This invention is directed to a waterborne polyolefin composition which is useful as an adhesion promotor and is prepared by emulsifying non-oxidized, non-maleated, non-chlorinated, crystalline polyolefins and non-chlorinated, maleated, amorphous polyolefins in the presence of a surfactant, an amine and water.

BACKGROUND OF THE INVENTION

Polyolefins generally require organic solvents or chemical modification either by oxidation or by malleation to make them water-dispersible which is necessary prior to emulsifying. The use of organic solvents, however, causes environmental concerns, and chemical modification of the polyolefins provides undesired end-use properties to formulated products incorporating the polyolefins and adds to the cost of the products.

U.S. Pat. No. 4,613,679 discloses emulsifiable polyolefin waxes prepared by reacting low molecular weight homopolymers and copolymers containing at least one alpha-olefin monomer having at least three carbon atoms with diesters of maleic acid in the presence of a free radical source. The grafting of the diesters of maleic acid onto poly-alpha-olefins is carried out in an inert atmosphere. The disadvantage of the process of U.S. Pat. No. 4,613,679 is that it requires malleation of polyolefins which modifies the end-use properties of the products due to change in molecular structure.

U.S. Pat. No. 3,644,258 discloses a method for preparing high solid latexes of olefin polymers which are prepared by: (1) heating a fluid, low-solids aqueous emulsion of the thermoplastic organic addition polymer in its alkaline salt form at a temperature between the softening point of the polymer and the point at which the polymer degrades while simultaneously lowering the pH of the emulsion to a value between 6.0–8.3 and (2) concentrating the emulsion to fluid latex with polymer content ranging about 40–65 wt %. The process requires acrylic monomers to be copolymerized with unsaturated olefins in the presence of free radical.

U.S. Pat. No. 3,919,176 discloses water-dispersible polyolefin compositions which are useful as hot melt adhesives. Such hot melt adhesives are prepared by using an esterified carboxylated polyolefin.

The disadvantage of the adhesive compositions disclosed in U.S. Pat. No. 3,919,176 is that the polyolefin undergoes chemical modification by a malleation process in the presence of free radical and neutralization by alkali to disperse in water.

U.S. Pat. No. 5,373,048 discloses an aqueous coating composition containing maleated polyolefins, a non-ionic surfactant, an amine and water which are emulsified. The aqueous coating composition disclosed in U.S. Pat. No. 5,373,048 provides poor adhesion to certain polymer substrates such as polypropylene.

There is a need for a non-halogenated, waterborne adhesion promoter to improve the adhesion of paints, inks and coatings to polymer substrates such as polypropylene, thermoplastic olefins, and polyethylene.

SUMMARY OF THE INVENTION

The present invention relates to a waterborne polyolefin composition for promoting adhesion especially on polymer substrates. The waterborne polyolefin has a particle size of 0.02 to 150 microns and comprises:

(A) 0.1 to 10 weight percent of at least one non-oxidized, non-maleated, non-chlorinated, crystalline polyolefin having a weight average molecular weight of 2,000 to 15,000, and a density less than 1.0 g/cc;

(B) 10 to 40 weight percent of at least one non-chlorinated, maleated, amorphous polyolefin having a weight average molecular weight of at least 500 and an acid number of 15 to 95;

(C) 0.1 to 10 weight percent of at least one surfactant having an hydrophilic-lipophilic balance of 6 to 18;

(D) 0.1 to 5 weight percent of at least one amine compound having a molecular weight of less than 150; and (E) 50 to 95 weight percent of water, provided said weight percents are based on the total weight of the waterborne composition.

The waterborne polyolefin composition is prepared by a process comprising the steps of:

(I) mixing
  (A) 0.1 to 10 weight percent of at least one non-oxidized, non-maleated, non-chlorinated, crystalline polyolefin having a weight average molecular weight of 2,000 to 15,000, and a density less than 1.0 g/cc;
  (B) 10 to 40 weight percent of at least one non-chlorinated, maleated, amorphous polyolefin having a weight average molecular weight of at least 500 and an acid number of 15 to 95;
  (C) 0.1 to 10 weight percent of at least one surfactant having an hydrophilic-lipophilic balance of 6 to 18;
  (D) 0.1 to 5 weight percent of at least one amine compound having a molecular weight of less than 150; and
  (E) 50 to 95 weight percent of water;

(II) heating the mixture of Step (I) at a temperature of 120° C. to 200° C. and a pressure of 60 kPa to 1500 kPa to form a waterborne polyolefin emulsion; and (III) cooling the waterborne polyolefin emulsion formed in Step (II) to a temperature of 20° C. to 70° C. to form a waterborne polyolefin composition, provided said weight percents are based on the total weight of the composition.

DESCRIPTION OF THE INVENTION

The present invention is directed to a waterborne polyolefin composition which is useful as an adhesion promotor and is prepared by emulsifying non-oxidized, non-maleated, non-chlorinated, crystalline polyolefins and non-chlorinated, maleated, amorphous polyolefins in the presence of a surfactant, an amine and water. The process involves three steps. In Step (I), at least one non-oxidized, non-maleated, non-chlorinated, crystalline polyolefin, component (A), at least one non-chlorinated, maleated, amorphous polyolefin, component (B), at least one surfactant, component (C), at least one amine compound, component (D), and water, component (E), are mixed in a pressure vessel such as a Parr reactor equipped for agitation to form a mixture. Step (I) is conducted at a temperature sufficient to produce a melt phase. Preferably, Step (I) is conducted at a temperature of 80° C. to 250° C., more preferably 120° C. to 180° C., and a pressure of 68.95 kPa (10 psi) to 1378.96 kPa (200 psi), preferably 413.69 kPa (60 psi) to 620.53 kPa. Preferably, the temperature and pressure are maintained for 10 to 150 minutes, more preferably, 30 to 45 minutes.

The non-oxidized, non-halogenated, non-maleated, crystalline polyolefins have a weight average molecular weight of 2,000 to 15,000, preferably 3,000 to 13,000. These polyolefins, component (A), are available as EPOLENE N-type polyolefins which are available in different grades from Eastman Chemical Company, Kingsport, Tenn. Examples of EPOLENE N polyolefins are listed in Table 1.

TABLE 1

| EPOLENE | VISCOSITY @ 257° F. (125° C.), CP | RBSP, °F. (°C.) | DENSITY G/CC | MOLECULAR WEIGHT ($M_w$) |
|---|---|---|---|---|
| N-10 | 1500 | 232 (111) | 0.925 | 10000 |
| N-11 | 350 | 226 (108) | 0.921 | 6000 |
| N-14 | 150 | 223 (106) | 0.920 | 4000 |
| N-34 | 450 | 217 (103) | 0.910 | 6200 |
| N-20 | 3725* | 246 (119) | 0.930 | 15000 |
| N-21 | 350* | 248 (120) | 0.950 | 6500 |
| N-15 | 600** | 325 (163) | 0.900 | 12000 |

The EPOLENE N-type polyolefins are usually polyethylene or polypropylene. The viscosity of these EPOLENE N polyolefins is reported at 125° C., except EPOLENE N-20, EPOLENE N-21 and EPOLENE N-15. For EPOLENE N-15, the viscosity is reported at 190° C., while viscosity for EPOLENE N-20 and EPOLENE N-21 is reported at 150° C. as shown in Table 1.

The non-halogenated maleated amorphous polyolefins, component (B), are selected from the following:

(1) amorphous, non-chlorinated, maleated polypropylene having an acid number in the range of 15 to 95, preferably 30 to 50, and a weight average molecular weight of at least 500;

(2) amorphous, non-chlorinated, maleated propylene-ethylene copolymer having propylene units in the range of 60 to 98 mole percent, preferable 80 to 95 mole percent, ethylene units in the range of 40 to 2 mole percent, preferably 20 to 5 mole percent, an acid number in the range of 15 to 95, preferable 30 to 50 and a weight average molecular weight of at least 500;

(3) amorphous, non-chlorinated, maleated propylene-hexene copolymer having propylene units in the range of 30 to 98 mole percent, preferably 35 to 95 mole percent, hexene units int he range of 70 to 2 mole percent, preferably 65 to 5 mole percent, an acid number in the range of 20 to 65, preferable 25 to 65 and a weight average molecular weight of at least 500;

(4) amorphous, non-chlorinated, maleated propylene-butene copolymer having propylene units in the range of 40 to 98 mole percent, preferable 45 to 90 mole percent, butene units in the range of 60 to 2 mole percent, preferable 55 to 10, and acid number in the range of 15 to 50, preferable 25 to 45 and a weight average molecular weight of at least 500;

(5) amorphous, non-chlorinated, maleated propylene-ethylene-butene terpolymer having propylene units in the range of 40 to 80 mole percent, preferably 50 to 80 mole percent, ethylene units in the range of 1 to 20 percent, butene units in the range of 30 to 60 mole percent, preferably 15 to 49 mole percent, an acid number int he range of 15 to 50, preferably 20 to 45 and a weight average molecular weight of at least 500; and (6) amorphous, non-chlorinated, maleated propylene-ethylene-hexene terpolymer having propylene units in the range of 40 to 80 mole percent, ethylene units in the range of 1 to 20 mole percent, hexene units in the range of 20 to 60 mole percent, and acid number in the range of 15 to 50 and a weight average molecular weight of at least 500.

Non-halogenated maleated amorphous polyolefins (MAPOs), component (B), are derived from amorphous polyolefins (APO's) by a malleation process. The malleation introduces a slight hydrophilicity to the non-halogenated maleated amorphous polyolefins. Therefore, the non-halogenated maleated amorphous polyolefins can be emulsified to achieve waterborne products.

The amine compound, component (C), is a primary, secondary or tertiary amine having a molecular weight of less than 150, preferably less than 100, and a functionality of 1 to 3. The amine can be an aromatic or aliphatic amine. Aliphatic amines having an amine functionality of between 1 and 3 are preferred. Optionally, the amines may contain other oxygen containing functional groups. The amine compound is present in the waterborne polyolefin compositions in an amount of 0.1 to 5 weight % based on the total weight of the composition. The amine compound is present in an amount of 2 to 30 weight percent, preferably 5 to 15 weight percent, based on the weight of the polyolefins. Examples of amine compounds have the formula:

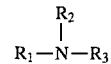

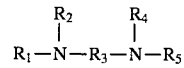

and

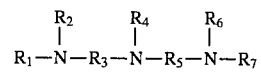

wherein $R_1$ to $R_7$ are independently selected from hydrogen or straight or branched chain alkyl, hydroxyalkyl, or alkoxylalkyl groups having 1 to 20 carbon atoms; $R_1$-$R_7$ can additionally include a substituted alkyl group, i.e., where one or more of the carbons in the radical is replaced with or has substituted thereon another functionality, e.g., an amine, ether, hydroxy or -mercapto moiety, e.g., tris-(3-aminopropyl) amine.

Another group of amine compounds are those primary, secondary or tertiary aliphatic amines of the above formula in which $R_1$-$R_7$ is specifically substituted with or contains one or more hydroxyl (—OH) functionalities. Examples of amine compounds have the formula:

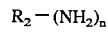

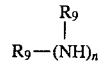

and

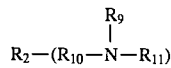

wherein n is 1 or 2 and $R_8$, $R_9$, $R_{10}$, and $R_{11}$ are independently selected from straight or branched chain alkyl, hydroxyalkyl or alkoxyalkyl groups having 1 to 20 carbon atoms. These chains may also be substituted with another functionality as described above.

The amine compounds may also contain one or more ether or alkoxy linkages. Such materials are sometimes referred to as poly(oxyalkylene)diamines. Ethoxylated or propoxylated materials are particularly preferred.

Suitable amine compounds for use in the waterborne polyolefin compositions of the present invention include: 2-amino-1-butanol, 4-amino-1-butanol, 2-aminoethanethiol, 2-aminoheptane, 2-amino-1-hexanol, 6-amino-1-hexanol, allylamine, 2-amino-3-methyl-1-butanol, 2-amino-2-methyl-1,3-propanediol, 2-amino-2-methyl-1-propanol, 2-amino-1-pentanol, 5-amino-1-pentanol, 3-amino-1-propanol, ammonium hydroxide, amylamine, butylamine, N,N'-bis(2-aminoethyl)-1,3-propanediamine, N,N'-bis(3-aminopropyl)-1,3-propanediamine, 1,3-bis(3-aminopropyl)-2-propanol, 1-[N,N-bis(2-hydroxyethyl)amino]-2-propanol, N,N'-bis(2-hydroxyethyl)ethylenediamine, decylamine, 1,4-diaminobutane, 1,10-diaminodecane, 1,12-diaminododecane, 1,7-diaminoheptane, 1,3-diamino-2-hydroxypropane, 3,3'-diamino-N-methyldipropylamine, 1,2-diamino-2-methylpropane, 1,9-diaminononane, 1,8-diaminooctane, 1,5-diaminopentane, 1,2-diaminopropane, 1,3-diaminopropane, dibutylamine, 3-(dibutylamino)propylamine, diethanolamine, diethylamine, 5-diethylamino-2-pentanol, 3-(diethylamino)-1,2-propanol, 1-diethylamino-2propanol, 3-diethylamino-1-propanol, 3-diethylaminopropylamine, diethylenetriamine, N,N-diethylethanolamine, N,N-diethylethylenediamine, N,N-diethylmethylamine, N,N'-diethyl-1,3-propanediamine, diisobutylamine, diisopropanolamine, diisoproylamine, 2-(diisopropylamino)ethanol, 3-diisopropylamino-1,2-propanediol, N,N-diisopropylethylamine, 1-dimethylamino-2-propanol, 2-dimethylaminoethanol, 3-dimethylamino-1-propanol, 3-dimethylaminopropylamine, 1,3-dimethylbutylamine, 3,3-dimethylbutylamine, N,N-dimethylethanolamine, N,N-dimethylethylamine, N,N-dimethylethylenediamine, N,N-dimethyl-N'-ethylethylenediamine, N,N'-dimethyl-1,6-hexanediamine, 2,5-dimethyl-2,5-hexanediamine, 1,5-dimethylhexylamine, 2,2-dimethyl-1,3-propanediamine, 1,2-dimethylpropylamine, dipropylamine, dodecylamine, ethanolamin, 3-ethoxypropylamine, ethylamine, 2-(ethylamino)ethanol, N-ethylbutylamine, 2-ethylbutylamine, N-ethyldiethanolamine, ethylenediamine, hexamethylenediamine, 1,6-hexanediamine, hexylamine, isoamylamine, isopropylamine, N-isopropylethylenediamine, N'-isopropyl-2-methyl-1,2-propanediamine, N,N,N',N'-tetramethyl-1,4-butanediamine, N,N,N',N'-tetramethyldiaminomethane, N,N,N',N'-tetramethylethylenediamine, N,N,N',N'-tetramethyl-1,3-propane-diamine, N,N,2,2-tetramethyl-1,3-propanediamine, tributylamine, tridecyamine, triethanolamine, triethylamine, triisooctylamine, triisopropyanolamine, trimethylamine, methylamine, 2-(methylamino)ethanol, N-Methylbutylamine, 1-methylbutylamine, 2-methylbutylamine, N-methyldiethanolamine, N-methylethylenediamine, N-methyl-1,3-propanediamine, morpholine, nonylamine, octylamine, teri-octylamine, propylamine, 2-(propylamino)ethanol, 1-tetradecylamine, and tris(3-aminopropyl)amine. Mixtures of amines may also be used. Preferred amine compounds are morpholine, 2-amino-2-methyl-1-propanol, 2-dimethylaminoethanol and ammonium hydroxide.

The surfactant, component (D), is a non-ionic, anionic, cationic or amphoteric sufactant. The choice of surfactant depends on the end-use application of the waterborne polyolefin composition. The hydrophilic-lipophilic balance (HLB) of the surfactant is an expression of the balance of the size and strength of the hydrophilic (polar) and the lipophilic (non-polar) groups of the surfactant. The surfactant has an average HLB of 6 to 18.

Hydrophilic-lipophilic balance values can be determined in a variety of ways. For example, hydrophilic-lipophilic balance numbers for certain types of non-ionic surface active agents, such as polyoxyethylene derivatives of fatty alcohols and polyhydric alcohol fatty acid esters, including those of polyglycols, can be calculated with the aid of the following equation:

$$HLB = 20\left(1 - \frac{S}{A}\right)$$

where S is the saponification number of the ester and A is the acid number of the acid. Thus, for a glycerol monostearate with S=161 and A=198, this equation gives a hydrophilic-lipophilic balance value of 3.8.

For other surfactants such as esters of tall oil and rosin, bees wax, lanolin, and the like, hydrophilic-lipophilic balance values can be calculated from the equation:

$$HLB = \frac{E + P}{S}$$

where E is the weight percent of oxyethylene and P is the weight percent of the polyhydric alcohol.

While the above formulas are satisfactory for many surfactants, the hydrophilic-lipophilic balance values for many surfactants must be estimated by experimental methods. The experimental method of hydrophilic-lipophilic balance value determination entails blending the unknown surfactant in varying ratios with a surfactant having a known hydrophobic-lipophobic balance value, then using the blend to emulsify an oil for which the hydrophilic-lipophilic balance required to emulsify the oil is known. The blend which performs the best is deemed to have a hydrophilic-lipophilic balance value approximately equal to the required HLB of the oil, so that the hydrophilic-lipophilic balance value for the unknown material can be calculated.

An approximation of the hydrophilic-lipophilic balance value for a range of surfactants can be obtained by evaluation of the water solubility of the particular surfactant as summarized in the following table:

| Behavior When Added to Water | HLB Range |
| --- | --- |
| No dispersibility in water | 1–4 |
| Poor dispersion | 3–6 |
| Milky dispersion after vigorous agitation | 6–8 |
| Stable milky dispersion (upper end almost translucent) | 8–10 |
| From translucent to clear dispersion | 10–13 |
| Clear Solution | 13+ |

Suitable surfactants for use in the waterborne polyolefins compositions include: mono- and diglycerides, sorbitan fatty acid esters, polyoxyethylene sorbitol esters, polyoxyethylene alcohols, ethoxylated alkylphenols, ethoxylated alcohols, polyalkylene glycol ethers, phosphated monoand diglycerides, citric acid esters of monoglycerides, diacetylated tartaric acid esters of monoglycerides, glycerol monooleate, sodium stearoyl lactylates, calcium stearoyl lactylates, phospholipids, phosphatidyl ethanolamine, glycerol monostearate, polyoxyethylene sorbitan fatty acid esters, polyethylene sorbitol esters, polyoxyethylene acids, polyoxyethylene alcohols, polyoxyethylene alkyl amines, alkyl aryl sulfonates, and ethoxylated alkylphenols. A combination of surfactants can also be used.

The amount of water, component (E), can vary widely depending on numerous factors, such as the needs of the manufacturer, transportation efficiencies and the needs of the particular application. Water is preferably present in the waterborne polyolefin composition in an amount of 50 to 95 weight %, preferably 55 to 90 weight %, based on the total weight of the composition. The waterborne polyolefin compositions can be prepared using less water than would typically be required to apply the compositions as a coating since water can be subsequently added later to prepare the diluted composition. Thus the manufacturer can prepare a "concentrated" product which is low in water and less costly to ship. A "concentrated" product is also often desired if the adhesion promoter composition is to be used as an additive to paint in order to prevent excessive dilution of the paint.

In Step (II), the mixture formed in Step (I) is heated at a temperature of 120° C. to 200° C. and a pressure of 60 kPa to 1500 kPa to form a waterborne polyolefin emulsion. Preferably the mixture is heated at a temperature of 120° C. to 170° C., more preferably 150° C. to 165° C. while continuously stirring to form a waterborne polyolefin emulsion. Preferably Step (II) is conducted at a pressure of 200 kPa to 1000 kPa, more preferably 400 kPa to 700 kPa.

Water, component (E), may optionally be injected at high pressure to the mixture in Step (II) to form the waterborne polyolefin emulsion instead of adding the water to Step (I) or in addition to the water added in Step (I).

In Step (III), the waterborne polyolefin emulsion formed in Step (II) is cooled by methods known in the art to a temperature of 20° C. to 70° C. to form a waterborne polyolefin composition. Preferably, the waterborne polyolefin emulsion is cooled to a temperature of 25° C. to 40° C.

It is important to note that a waterborne polyolefin emulsion incorporating components (A) through (E) can be prepared by a process which involves combining components (A) and (B) at a temperature of 80° C. to 250° C. to form a mixture, cooling the mixture and adding components (C), (D), and (E). The resulting mixture is heated at a temperature of 120° C. to 200° C. to form a waterborne polyolefin composition. The present inventors have determined, however, that a waterborne polyolefin composition prepared by this method does not function well as an adhesion promoter. In contrast, waterborne polyolefin compositions prepared by the process of the present invention function as excellent adhesion promoters to enhance the adhesion of paints to polymer substrates.

The waterborne polyolefin compositions may contain an additive. Suitable additives include, for example, thickeners, wetting agents, flow aids, pigments, resins, fillers, stabilizers, antioxidants, buffers, colorants, dyes, and organic solvents. Such additives, their amounts, and their use are well known in the art.

The waterborne polyolefin compositions have a particle size suitably small to make the compositions useful in coating applications. The waterborne polyolefins have a particle size of 0.02 to 150 microns, preferably 0.1 to 50 microns. Thus, the compositions of this invention include not only "emulsions" and "dispersions" but also admixtures. For example, water containing admixtures wherein the particle size in the range of $1.0 \times 10^{-4}$ mm (0.1 μ) to $10 \times 10^{-2}$ mm (10 μ) have been characterized as an "emulsions". Water containing admixtures wherein the particle size is greater than $1.0 \times 10^{-2}$ mm (10 microns) have been characterized as a "dispersion". While both of these types of admixtures are within the scope of this invention, the invention is not limited to these or any other kind of particular admixture and includes all possible types of admixtures regardless of physical form as long as the particle size is small enough for the admixtures to have utility in coating applications.

While the compositions of this invention are particularly useful as adhesion promoters to enhance the adhesion of paints to polymer substrates it is within the scope of the invention for the compositions to be used by themselves as a paint to form a final protective coating which not only protects the substrate but also is decorative as a result of the addition of pigments.

The materials and testing procedures used for the results shown herein are as follows:

Acid numbers of the polyolefins were determined by ASTM D1386.

Inherent viscosity (I.V.) was measured at 23° C. using 0.50 grams of polymer per 100 ml of a solvent consisting of 60% by weight phenol and 40% by weight tetrachloroethane.

The following examples are intended to illustrate, but not limit, the scope of this invention. All parts and percentages in the examples are on a weight basis unless otherwise stated.

EXAMPLE 1

This example illustrates the emulsification of crystalline, non-oxidized, non-halogenated, non-maleated, almost chemically inert (EPOLENE N-15) polyolefin using non-halogenated maleated amorphous polyolefins (MAPO), a non-ionic surfactant, amine and water. The ingredients and their amount used were as follows:

| Ingredients | Amount (g) | (wt. %) |
|---|---|---|
| EPOLENE ® N-15 (polypropylene) | 6.0 | 3.71 |
| MAPO (propylene-hexene copolymer) Acid No. = 50 | 34.0 | 21.01 |
| GENAPOL UD050 (Nonionic Surfactant) | 12.0 | 7.42 |
| 2-Amino-2-Methyl-1-propanol | 5.8 | 3.58 |
| Water | 104.0 | 64.28 |

The emulsion was prepared as follows:

(1) Added EPOLENE N-15, non-halogenated maleated amorphous polyolefins (MAPO), surfactant, amine and water to a Parr Pressure Reactor.

(2) The reactor was sealed and heated to 338° F. (170° C.), while continuously stirring the ingredients. The reactor pressure is about 620.53 kPa (90 psi)-689.48 kPa (100 psi).

(3) Maintained the reactor temperature 338° F. (170° C.) for about 30–45 minutes, while continuously stirring the mixture.

(4) Allowed reactor to cool down to about 86° F. (30° C.), while continuously mixing with stirrer.

(5) Removed the emulsion from the reaction chamber, and store it in a suitable container The emulsion was milky in color with particle size less than 0.09 mm (90 micron). The pH of the waterborne polyolefin was 10.15. A stable dispersion was obtained.

EXAMPLE 2

Example 1 was repeated except that the amount of EPOLENE N-15 was 3.0 grams instead of 6.0 grams. The ingredients used to prepare the waterborne polyolefins was as follows:

| Ingredients | Amount (g) | (wt. %) |
|---|---|---|
| EPOLENE ® N-15 (polypropylene) | 3.0 | 1.88 |
| MAPO (propylene-hexene copolymer) Acid No. = 50 | 37.0 | 23.14 |
| Genapol UD050 (Nonionic Surfactant) | 10.5 | 6.56 |
| 2-Amino-2-Methyl-1-propanol | 5.4 | 3.38 |
| Water | 104.0 | 65.04 |

The emulsion pH was 10.24 with particle size in the range of 0.02 mm (20.0 μ)–0.09 mm (90.0 μ). The waterborne polyolefins were milky in color.

EXAMPLE 3

Example 1 was repeated except that a homogeneous blend of EPOLENE N-15 and non-halogenated maleated amorphous polyolefin (MAPO) was used instead of adding EPOLENE N-15 and non-halogenated maleated amorphous polyolefin separately to the reactor. The homogeneous blend of EPOLENE N-15 and non-halogenated maleated amorphous polyolefins was prepared by heating non-halogenated maleated amorphous polyolefins to 356° F. (180° C.)–365° F. (185° C.) in order to dissolve EPOLENE N-15 in the melted non-halogenated maleated amorphous polyolefins. The material after complete mixing was cooled to room temperature. This blend was used for preparing an emulsion in a Parr Pressure Reactor. The composition was as follows:

| Ingredients | Amount (g) | (wt. %) |
|---|---|---|
| EPOLENE ® N-15 (polypropylene) | 6.0 | 3.71 |
| MAPO (propylene-hexene copolymer) Acid No. = 50 | 34.0 | 21.01 |
| Genapol UD050 (Nonionic Surfactant) | 12.0 | 7.42 |
| 2-Amino-2-Methyl-1-propanol | 5.8 | 3.58 |
| Water | 104.0 | 64.28 |

The process described in Example 1 was used to prepare an emulsion. The emulsion was translucent (almost clear), and the particle size ranged between $2.0 \times 10^{-5}$ mm (0.02 μ)–$2.0 \times 10^{-2}$ mm (20.0 μ). The uniform blending of EPOLENE N-15 in non-halogenated maleated amorphous polyolefins melt provided almost clear and small size emulsion as compared to adding EPOLENE N-15 and non-halogenated maleated amorphous polyolefins to the Pressure Reactor. The emulsion pH was about 10.12.

EXAMPLE 4

Example 3 was repeated except that a homogeneous blend of EPOLENE N-15 and non-halogenated maleated amorphous polyolefins (MAPO) was prepared by using 30/70 wt/wt (EPOLENE N-15/non-halogenated maleated amorphous polyolefins) ratio instead of 15/85. The ingredients were as follows:

| Ingredients | Amount (g) | (wt. %) |
|---|---|---|
| EPOLENE ® N-15 (polypropylene) | 12.0 | 7.41 |
| MAPO (propylene-hexene copolymer) Acid No. = 50 | 28.0 | 17.31 |
| Genapol UD050 (Nonionic Surfactant) | 12.0 | 7.42 |
| 2-Amino-2-Methyl-1-propanol | 5.8 | 3.58 |
| Water | 104.0 | 64.28 |

The process described in Example 1 was used to prepare an emulsion. The emulsion was milky in color, The particle size was $2.0 \times 10^{-5}$ mm (0.02 μ)–$5.0 \times 10^{-2}$ mm (50.0 μ). The pH of waterborne polyolefins was 10.21.

EXAMPLE 5

Example 1 was repeated except that amorphous, non-halogenated maleated amorphous polyolefins (MAPO) (propylene homopolymer) was used instead of amorphous, non-halogenated maleated amorphous polyolefins based on propylene-hexene copolymer. The ingredients used to emulsify EPOLENE® N-15 were as follows:

| Ingredients | Amount (g) | (wt. %) |
|---|---|---|
| EPOLENE ® N-15 (polypropylene) | 6.0 | 3.70 |
| MAPO (propylene-hexene copolymer) Acid No. = 50 | 34.0 | 20.96 |
| GENAPOL UD050 (Nonionic Surfactant) | 12.0 | 7.40 |
| 2-Amino-2-Methyl-1-propanol | 6.2 | 3.82 |
| Water | 104.0 | 64.12 |

The ingredients were heated for two hours at 320° F. (160° C.) in an air tight pressure reactor. The milky emulsion was filtered before being used. The pH of the emulsion was 10.19. The particle size was in the range of $2.0 \times 10^{-5}$ mm (0.02 μ)–$1.0 \times 10^{-1}$ (100.0 μ).

EXAMPLE 6

Example 2 was repeated except that EPOLENE N-34 was used instead of EPOLENE N-15 in preparing polyolefin blends at a temperature of 180° C. to 185° C. This blend was used to emulsify EPOLENE N-34 in accordance with the process as described in Example 1. The ingredients used to emulsify EPOLENE N-34 were as follows:

| Ingredients | Amount (g) | (wt. %) |
|---|---|---|
| EPOLENE ® N-34 (polypropylene) | 13.36 | 8.30 |
| MAPO (propylene-hexene copolymer) | 26.64 | 16.57 |
| Genapol UD050 (Nonionic Surfactant) | 12.00 | 7.46 |
| 2-dimethylaminoethanol | 4.80 | 2.98 |
| Water | 104.0 | 64.69 |

The particle size of the emulsion was less than 0.03 mm (30 μm). The emulsion was milky in color.

COMPARATIVE EXAMPLE 7

Example 1 was repeated except that non-halogenated maleated amorphous polyolefins (MAPO) polyolefin (propylene-hexene copolymer) was removed from the formulation. The process was the same as described in Example 1. The composition was as follows:

| Ingredients | Amount (g) | (wt. %) |
|---|---|---|
| EPOLENE ® N-15 (polypropylene) | 40.0 | 24.72 |
| Genapol UD050 (Nonionic Surfactant) | 12.0 | 7.42 |
| 2-Amino-2-Methyl-1-propanol | 5.8 | 3.58 |
| Water | 104.0 | 64.28 |

The EPOLENE N-15 was in solid form and did not emulsify. Two distinct phases were observed after the process.

EXAMPLE 8

Example 1 was repeated except that TRITON N-101 surfactant was used instead of Genapol UD050 surfactant in preparing waterborne polyolefin (EPOLENE N-15). The ingredients used were as follows:

| Ingredients | Amount (g) | (wt. %) |
|---|---|---|
| EPOLENE ® N-15 (polypropylene) | 6.0 | 3.77 |
| MAPO (propylene-hexene copolymer) Acid No. = 50 | 34.0 | 21.38 |
| TRITON N-101 surfactant | 9.2 | 5.79 |
| 2-Amino-2-Methyl-1-propanol | 5.8 | 3.65 |
| Water | 104.0 | 65.41 |

The emulsion appeared milky in color. The particle size of the emulsion was less than 0.1 mm (100 micron). The pH of the emulsion was about 10.24.

The results in Examples 1–6 and 8 clearly show that it is essential to blend EPOLENE N-15 with non-halogenated maleated amorphous polyolefins (MAPO) in order to emulsify the EPOLENE N-15. In Comparative Example 7 the non-halogenated maleated amorphous polyolefin was not present and as a result the EPOLENE N-15 did not emulsify.

TABLE II

DESIGNATION AND COMPOSITION OF WATERBORNE POLYOLEFINS

| INGREDIENTS | a | b | c (*) | d | e | f |
|---|---|---|---|---|---|---|
| EPOLENE N SERIES POLYOLEFINS | | | | | | |
| EPOLENE N-15 | 3.71 | 1.88 | 3.71 | 3.70 | — | 3.77 |
| EPOLENE N-34 | — | — | — | — | 8.30 | — |
| MALEATED POLYOLEFINS (MAPO's) | | | | | | |
| PROPYLENE-HEXENE COPOLYMER | 21.01 | 23.14 | 21.01 | — | 16.57 | 21.38 |
| PROPYLENE HOMOPOLYMER | — | — | — | 20.96 | — | — |
| SURFACTANT | | | | | | |
| GENAPOL UD050 | 7.42 | 6.56 | 7.42 | 7.40 | 7.46 | — |
| TRITON N-101 | — | — | — | — | — | 5.79 |
| AMINE | | | | | | |
| 2-AMINO-2-METHYL-1-PROPANOL | 3.58 | 3.38 | 3.58 | 3.82 | — | 3.65 |
| 2-DIMETHYLAMINOETHANOL | — | — | — | — | 2.98 | — |
| WATER | 64.3 | 65.0 | 64.3 | 64.1 | 64.7 | 65.4 |

(*) An homogeneous blend of Epolene N-15 and MAPO was prepared before emulsification process.

EXAMPLE 9

The waterborne polyolefin (a) was prepared according to the procedure set forth in Example 1 and tested for adhesion on thermoplastic polyolefin (TPO, Himont 3131) substrate. The waterborne polyolefin (a) was further diluted with water to about 10.0 weight % solid content. The diluted polyolefin (a) was applied by spraying onto TPO substrate panels. The sprayed material was dried at 170.6° F. (77° C.) for 10 minutes. The coated panels were examined for adhesion in accordance with the ASTM D3359M procedure. The coated panels were also visually examined for degree of blistering in accordance with the ASTM D714-87 procedure. The integrity of the coated film was visually assessed. The degree of blistering was rated as follows:

Rating for Blistering

10=Excellent: No blistering

8=Smallest blister seen by the naked eye

D=Dense
MD=Medium dense
F=Few The results were as follows:

| TIME (DAYS) | % RETAINED ADHESION | BLISTER RATING |
|---|---|---|
| 0 | 100 | 10 |
| 6 | 100 | 10 |
| 12 | 100 | 10 |
| 24 | 100 | 10 |

The results in Example 9 demonstrate that the waterborne polyolefins of this invention had an excellent adhesion without blistering over a period of about 24 days. Similar results were obtained using waterborne polyolefins b, c, d, e, and f of Table II.

EXAMPLE 10

Example 9 was repeated except that the coated panels were placed at 0° F. (−17.78° C.) instead of an ambient temperature for examining the adhesion and blister formation. The results indicated that the adhesion was 100% retained without blister formation during the testing period. Similar results were obtained using waterborne polyolefins b, c, d, e, and f of Table II.

EXAMPLE 11

Example 9 was repeated with the exception that the coated panels were placed at 250° F. (121.11° C.) instead of an ambient temperature for examining the adhesion and blister formation. The results indicated that the adhesion was 100% retained without blister formation during the testing period of about 24 days. Similar results were obtained using waterborne polyolefins b, c, d, e, and f of Table II.

EXAMPLE 12

This example illustrates the adhesion of PPG BC/CC automotive OEM paint on TPO in the presence of waterborne polyolefins of this invention used as a primer. The TPO panels were coated as described in Example 9. After drying primed panels at 170.6° F. (77° C.) for 10 minutes, the panels were coated with PPG BC/CC automotive OEM paint. The coated panels were examined for paint adhesion as disclosed in Example 9. Results for paint adhesion and blister formation were as follows:

| TIME (MONTHS) | % RETAINED ADHESION | BLISTER RATING |
|---|---|---|
| 0 | 100 | 10 |
| 1 | 100 | 10 |
| 2 | 100 | 10 |
| 3 | 100 | 10 |

The results demonstrated that the waterborne polyolefins of this invention showed excellent adhesion properties without blistering over a period of at least three months.

EXAMPLE 13

Example 12 was repeated except that the adhesion and blister formation were studied in a humid environment (e.g. cleveland humidity cabinet at 49° C. or 120° F.) instead of room temperature. Results reported are an average value of three readings.

PPG BC/CC paint adhesion:
after 24 hours=100%; No blistering
after 72 hours=100%; No blistering

EXAMPLE 14

Example 12 was repeated except that a Red Spot pigmented (white) 2-part polyurethane elastomeric enamel automotive OEM type paint was used instead of PPG BC/CC paint for coating TPO panels. Initial adhesion of paint on TPO was excellent and blister formation was observed at room temperature for a period of at least three months.

EXAMPLE 15

Example 14 was repeated except that the adhesion and blister formation were studied in a humid environment ((e.g. cleveland humidity cabinet at 49° C. or 120° F.) instead of at room temperature. The results were as follows:

Red Spot pigmented (white) 2-part polyurethane paint adhesion:
after 24 hours=100% No blistering
after 72 hours=100% No blistering
after 336 hours=100% No blistering

EXAMPLE 16

Example 15 was repeated for comparing adhesion on TPO automotive parts using the waterborne Epolene N-15/MAPO of the present invention and MAPO emulsion prepared in accordance with the process described in U.S. Pat. No. 5,373,048. The degree of blistering was determined according to the method set forth in Example 9. Results obtained were recorded as an average of three readings as follow:

| ADHESION DATA | PRESENT INVENTION | U.S. Pat. No. 5,373,048 |
|---|---|---|
| RETAINED ADHESION | | |
| Initial Adhesion | 100 | 100 |
| Humidity Resistance | | |
| 24 Hours | 100 | 70 |
| 96 Hours | 100 | 0 |
| 432 Hours | 100 | 0 |
| 576 Hours | 94 | 0 |
| BLISTER FORMATION(*) | | |
| Initial | 10 | 10 |
| Humidity Resistance | | |
| 24 Hours | 10 | 10 |
| 96 Hours | 10 | 10 |
| 432 Hours | 10 | — |
| 576 Hours | 10 | — |

The data presented in the above table clearly indicates that the Epolene N-15 containing waterborne polyolefins of the present invention exhibit superior adhesion as compared to the product prepared according to the process described in the U.S. Pat. No. 5,373,048.

Many variations will suggest themselves to those skilled in this art in light of the above detailed description. All such obvious modifications are within the full intended scope of the appended claims.

What is claimed is:

1. A waterborne polyolefin composition for promoting adhesion, said waterborne polyolefin having a particle size of 0.02 to 150 microns comprising:

(A) 0.1 to 10 weight percent of at least one non-oxidized, non-maleated, non-chlorinated, crystalline polyolefin having a weight average molecular weight of 2,000 to 15,000, and a density less than 1.0 g/cc;

(B) 10 to 40 weight percent of at least one non-chlorinated, maleated, amorphous polyolefin having a weight average molecular weight of at least 500 and an acid number of 15 to 95;

(C) 0.1 to 10 weight percent of at least one surfactant having an hydrophilic-lipophilic balance of 6 to 18;

(D) 0.1 to 5 weight percent of at least one amine compound having a molecular weight of less than 150; and (E) 50 to 95 weight percent of water, provided said weight percents are based on the total weight of the waterborne composition.

2. A waterborne polyolefin composition for promoting adhesion, said waterborne polyolefin having a particle size of 0.02 to 150 microns comprising:

(A) 0.5 to 5 weight percent of at least one non-oxidized, non-maleated, non-chlorinated, crystalline polyolefin having a weight average molecular weight of 5,000 to 12,000, and a density less than 1.0 g/cc;

(B) 15 to 35 weight percent of at least one non-chlorinated, maleated, amorphous polyolefin having a weight average molecular weight of at least 500 and an acid number of 15 to 95;

(C) 1 to 5 weight percent of at least one surfactant having an hydrophilic-lipophilic balance of 8 to 14;

(D) 0.1 to 5 weight percent of at least one amine compound having a molecular weight of less than 100; and (E) 55 to 90 weight percent of water, provided said weight percents are based on the total weight of the waterborne composition.

3. A process for preparing a waterborne polyolefin composition useful as an adhesion promotor wherein said waterborne polyolefin has a particle size of 0.02 to 150 microns, said process comprising the steps of:

(I) mixing (A) 0.1 to 10 weight percent of at least one non-oxidized, non-maleated, non-chlorinated, crystalline polyolefin having a weight average molecular weight of 2,000 to 15,000, and a density less than 1.0 g/cc;

(B) 10 to 40 weight percent of at least one non-chlorinated, maleated, amorphous polyolefin having a weight average molecular weight of at least 500 and an acid number of 15 to 95;

(C) 0.1 to 10 weight percent of at least one surfactant having an hydrophilic-lipophilic balance of 6 to 18;

(D) 0.1 to 5 weight percent of at least one amine compound having a molecular weight of less than 150; and (E) 50 to 95 weight percent of water;

(II) heating the mixture of Step (I) at a temperature of 120° C. to 200° C. and a pressure of 60 kPa to 1500 kPa to form a waterborne polyolefin emulsion; and (III) cooling the waterborne polyolefin emulsion formed in Step (II) to a temperature of 20° C. to 70° C. to form a waterborne polyolefin composition, provided said weight percents are based on the total weight of the composition.

4. A process for preparing a waterborne polyolefin composition useful as an adhesion promotor wherein said waterborne polyolefin has a particle size of 0.02 to 150 microns, said process comprising the steps of:

(I) mixing (A) 0.1 to 10 weight percent of at least one non-oxidized, non-maleated, non-chlorinated, crystalline polyolefin having a weight average molecular weight of 2,000 to 15,000, and a density less than 1.0 g/cc;

(B) 10 to 40 weight percent of at least one non-chlorinated, maleated, amorphous polyolefin having a weight average molecular weight of at least 500 and an acid number of 15 to 95;

(C) 0.1 to 10 weight percent of at least one surfactant having an hydrophilic-lipophilic balance of 6 to 18; and (D) 0.1 to 5 weight percent of at least one amine compound having a molecular weight of less than 150;

(II) heating the mixture of Step (I) at a temperature of 120° C. to 200° C. and a pressure of 60 kPa to 1500 kPa and injecting 50 to 95 weight percent of water into the mixture of Step (II) to form a waterborne polyolefin emulsion; and (III) cooling the waterborne polyolefin emulsion formed in Step (II) to a temperature of 20° C. to 70° C. to form a waterborne polyolefin composition, provided said weight percents are based on the total weight of the composition.

5. The waterborne polyolefin composition of claim 1 wherein the amorphous maleated polyolefin, component (B), has an acid number in the range of 30 to 50.

6. The process of claim 3 wherein the amorphous maleated polyolefin, component (B), has an acid number in the range of 30 to 50.

7. The waterborne polyolefin composition of claim 1 wherein the amorphous polyolefin is selected from the group consisting of maleated polypropylene, maleated propylene-ethylene, maleated propylene-hexene, maleated propylene-butene, maleated Propylene-ethylene-butene and maleated Propylene-ethylene-hexene.

8. The process of claim 3 wherein the amorphous polyolefin is selected from the group consisting of maleated polypropylene, maleated propylene-ethylene, maleated propylene-hexene, maleated propylene-butene, maleated Propylene-ethylene-butene and maleated Propylene-ethylene-hexene.

9. The waterborne polyolefin composition of claim 1 wherein the amorphous polyolefin has a repeating unit selected from the group consisting of ethylene, propylene, butene, hexene, and combinations thereof.

10. The process of claim 3 wherein the amorphous polyolefin has a repeating unit selected from the group consisting of ethylene, propylene, butene, hexene, and combinations thereof.

11. The waterborne polyolefin composition of claim 9 wherein the amorphous polyolefin is a homopolymer having propylene units in the range of 15 to 95 mole percent.

12. The process of claim 10 wherein the amorphous polyolefin is a homopolymer having propylene units in the range of 15 to 95 mole percent.

13. The waterborne polyolefin composition of claim 9 wherein the amorphous polyolefin is a copolymer having propylene units in the range of 30 to 98 mole percent.

14. The process of claim 10 wherein the amorphous polyolefin is a copolymer having propylene units in the range of 30 to 98 mole percent.

15. The waterborne polyolefin composition of claim 9 wherein the amorphous polyolefin is a terpolymer having propylene units in the range of 40 to 80 mole percent.

16. The process of claim 10 wherein the amorphous polyolefin is a terpolymer having propylene units in the range of 40 to 80 mole percent.

17. The waterborne polyolefin composition of claim 9 wherein the amorphous polyolefin is a terpolymer having ethylene units in the range of 1 to 20 mole percent.

18. The process of claim 10 wherein the amorphous polyolefin is a terpolymer having ethylene units in the range of 1 to 20 mole percent.

19. The process of claim 3 wherein Step (II) is conducted at a temperature of 140° C. to 180° C.

20. The waterborne polyolefin composition of claim 1 wherein the amine, component (D), is selected from the group consisting of morpholine, 2-amino-2-methyl-1-propanol, 2-dimethylaminoethanol, ammonium hydroxide, and combinations thereof.

21. The process of claim 3 wherein the amine, component (D), is selected from the group consisting of morpholine, 2-amino-2-methyl-1-propanol, 2-dimethylaminoethanol, ammonium hydroxide, and combinations thereof.

22. The waterborne polyolefin composition of claim 1 wherein the waterborne polyolefin has a particle size of 5 to 100 microns.

23. The process of claim 3 wherein the waterborne polyolefin has a particle size of 5 to 100 microns.

24. The process of claim 3 wherein Step (II) is conducted at a pressure of 200 kPa to 1000 kPa.

25. The waterborne polyolefin composition of claim 1 which is applied on a substrate selected from the group consisting of polymer, wood, concrete, and glass.

* * * * *